(12) United States Patent
Leviness (10) Patent No.: US 8,614,158 B2
(45) Date of Patent: Dec. 24, 2013

(54) FISCHER-TROSPCH AND OXYGENATE SYNTHESIS CATALYST ACTIVATION/REGENERATION IN A MICRO SCALE PROCESS (75) Inventor: Stephen C. Leviness, Tulsa, OK (US)

(73) Assignee: Schlumberger Technology Corporation, Sugar Land, TX (US)

( * ) Notice: Subject to any disclaimer, the term of this patent is extended or adjusted under 35 U.S.C. 154(b) by 845 days.

(21) Appl. No.: 12/040,500

(22) Filed: Feb. 29, 2008

(65) Prior Publication Data
US 2009/0221723 A1 Sep. 3, 2009

(51) Int. Cl.
B01J 20/34 (2006.01)

(52) U.S. Cl.
USPC ............. 502/20; 502/338; 502/344; 502/325; 518/709; 518/715; 518/713

(58) Field of Classification Search
USPC .......... 518/706, 709, 715, 713; 502/100, 344, 502/325, 20, 338
See application file for complete search history.

(56) References Cited

U.S. PATENT DOCUMENTS

| | | |
|---|---|---|
| 2,289,731 A | 7/1942 | Roelen et al. |
| 2,487,867 A | 11/1949 | Griffin, Jr. |
| 4,207,208 A | 6/1980 | Lucki et al. |
| 4,525,206 A | 6/1985 | Soled et al. |
| 4,585,798 A | 4/1986 | Beuther et al. |
| 4,595,703 A | 6/1986 | Payne et al. |
| 4,605,676 A | 8/1986 | Kobylinski et al. |
| 4,605,679 A | 8/1986 | Kobylinski et al. |
| 4,607,020 A | 8/1986 | Soled et al. |
| 4,663,305 A | 5/1987 | Mauldin et al. |
| 4,670,414 A | 6/1987 | Kobylinski et al. |
| 4,670,475 A | 6/1987 | Mauldin |
| 4,717,702 A | 1/1988 | Beuther et al. |
| 4,729,981 A | 3/1988 | Kobylinski et al. |
| 4,738,948 A | 4/1988 | Iglesia et al. |
| 4,755,536 A | 7/1988 | Mauldin et al. |
| 4,769,127 A | 9/1988 | Erickson et al. |
| 4,801,573 A | 1/1989 | Eri et al. |
| 4,822,824 A | 4/1989 | Iglesia et al. |
| 4,857,497 A | 8/1989 | De Jong et al. |
| 4,863,894 A | 9/1989 | Chinchen et al. |
| 4,962,078 A | 10/1990 | Behrmann et al. |
| 5,128,377 A | 7/1992 | Behrmann et al. |
| 5,260,239 A | 11/1993 | Hsia |
| 5,268,344 A | 12/1993 | Pedrick et al. |
| 5,283,216 A | 2/1994 | Mitchell |
| 5,288,673 A | 2/1994 | Behrmann et al. |
| 5,389,690 A | 2/1995 | Mitchell |

(Continued)

FOREIGN PATENT DOCUMENTS

| | | |
|---|---|---|
| GB | 2 380 739 | 4/2003 |
| WO | WO 03/099961 | 12/2003 |

(Continued)

Primary Examiner — Kaj K Olsen
Assistant Examiner — Pritesh Darji (57) ABSTRACT

Processes for activating and/or regenerating Fischer-Tropsch and/or oxygenate synthesis catalysts include the transportation of a modular, portable catalyst activation and/or regeneration unit to Fischer-Tropsch and/or oxygenate production units. An alternative process for activating and/or regenerating Fischer-Tropsch and/or oxygenate synthesis catalysts includes activating and/or regenerating the catalyst in a production unit at a catalyst treatment facility. An alternative process for activating and/or regenerating Fischer-Tropsch and/or oxygenate synthesis catalysts includes activating and/or regenerating the catalyst in a synthesis reactor at a catalyst treatment facility.

30 Claims, 6 Drawing Sheets

(56) References Cited

U.S. PATENT DOCUMENTS

| | | |
|---|---|---|
| 5,585,316 A | 12/1996 | Nay et al. |
| 5,756,419 A | 5/1998 | Chaumette et al. |
| 5,817,701 A | 10/1998 | Leviness et al. |
| 5,844,005 A | 12/1998 | Bauman et al. |
| 5,928,985 A | 7/1999 | Williams |
| 6,022,755 A | 2/2000 | Kinnari et al. |
| 6,162,754 A | 12/2000 | Maretto et al. |
| 6,201,030 B1 | 3/2001 | Beer |
| 6,300,268 B1 | 10/2001 | Lapidus et al. |
| 6,455,596 B2 | 9/2002 | Lapidus et al. |
| 6,486,220 B1 | 11/2002 | Wright |
| 6,537,945 B2 | 3/2003 | Singleton et al. |
| 6,706,661 B1 | 3/2004 | Krylova et al. |
| 6,716,886 B2 | 4/2004 | Krylova et al. |
| 6,753,286 B2 | 6/2004 | Clark et al. |
| 6,753,351 B2 | 6/2004 | Clark et al. |
| 6,753,354 B2 | 6/2004 | Koveal et al. |
| 6,777,451 B2 | 8/2004 | Koveal et al. |
| 6,800,579 B2 | 10/2004 | Daage et al. |
| 6,812,179 B2 | 11/2004 | Huang et al. |
| 6,815,388 B1 | 11/2004 | Ohlbach et al. |
| 6,838,487 B1 | 1/2005 | Demirel et al. |
| 6,869,978 B2 | 3/2005 | Wright et al. |
| 6,878,655 B2 | 4/2005 | Raje et al. |
| 6,900,151 B2 | 5/2005 | Soled et al. |
| 6,949,488 B2 | 9/2005 | Belt et al. |
| 6,962,947 B2 | 11/2005 | Wright et al. |
| 6,989,403 B2 * | 1/2006 | Huang et al. .................. 518/709 |
| 7,303,731 B2 | 12/2007 | Demirel et al. |
| 2004/0242941 A1 | 12/2004 | Green et al. |
| 2005/0250863 A1 | 11/2005 | Green et al. |
| 2006/0058564 A1* | 3/2006 | Sills et al. .................... 585/709 |
| 2006/0165570 A1* | 7/2006 | Knopf et al. .................. 422/224 |
| 2007/0004810 A1 | 1/2007 | Wang et al. |
| 2007/0112080 A1 | 5/2007 | Green et al. |

FOREIGN PATENT DOCUMENTS

| | | |
|---|---|---|
| WO | WO 2006/058107 | 6/2006 |
| WO | WO 2007/015201 | 2/2007 |
| WO | WO 2007/127898 | 11/2007 |

* cited by examiner

FISCHER-TROSPCH AND OXYGENATE SYNTHESIS CATALYST ACTIVATION/REGENERATION IN A MICRO SCALE PROCESS

FEDERALLY SPONSORED RESEARCH

Not applicable

REFERENCE TO MICROFICHE APPENDIX

Not applicable.

FIELD OF THE INVENTION

This invention relates to a method for activation and regeneration of Fischer-Tropsch ("FT") and/or oxygenate synthesis catalysts for producing FT liquids an/or oxygenates from synthesis gases in a portable, small, or micro, scale facility using natural gas, biomass, coal, or other carbon-containing compound as an initial feedstock.

BACKGROUND OF THE INVENTION

Synthesis gas (or "syngas") is a mixture of primarily hydrogen and carbon monoxide, commonly with carbon dioxide, methane, water, nitrogen, and possibly other constituents such as argon or helium. Syngas can be produced from any carbon containing feedstock, including natural gas, heavy petroleum cuts such as resid or coke, bitumen, coal, or biomass by a variety of processes. Natural gas may be converted to synthesis gas using steam methane reforming ("SMR"), carbon dioxide reforming ("dry reforming"), or a combination of these two processes, or by processes employing air, enriched air, or oxygen (generally with some steam addition) such as combined reforming, autothermal reforming ("ATR"), catalytic partial oxidation ("CPOX") or thermal partial oxidation ("POX"). When employed, enriched air or oxygen may be produced by conventional cryogenic air separation, pressure swing adsorption ("PSA") or membrane processes, the use of ion transport membranes ("ITM") or any other method producing a gas containing sufficient oxygen. Heavier liquids or solids, such as petroleum cuts and/or coal, are typically converted to synthesis gas by processes employing air, enriched air, or oxygen such as gasification and catalytic/thermal partial oxidation, again typically with some steam addition to the reaction mixture. Numerous synthesis gas production processes are well known in the art.

As used herein, the term "catalyst" covers both the catalyst in active form and the catalyst in precursor form. Iron, cobalt, nickel, and ruthenium are active Fischer-Tropsch catalyst metals. Nickel-containing catalysts typically produce a light product slate comprised primarily of $C_1$-$C_4$ gases. Therefore, nickel-containing catalysts are not generally practical for Fischer-Tropsch processes when the desired product slate is comprised primarily of $C_{5+}$ liquids. Ruthenium-containing catalysts generally exhibit very good to excellent selectivity for heavier (i.e. $C_{5+}$) hydrocarbon products, but may be too rare and expensive for practical use. Iron is typically employed as an FT catalyst in precipitated or sintered (i.e., unsupported) form, with a variety of chemical (e.g., potassium, copper) and/or structural (e.g., alumina, silica) promoters added. Cobalt, for use in an FT catalyst, is typically dispersed on a porous refractory oxide support such as alumina, silica, titania, zinc oxide, or a zeolite, with the addition of reduction promoters (typically a platinum group metal ("PGM") such as ruthenium, rhenium, platinum, or palladium) and other chemical and/or support modifiers (e.g., rare earth oxides, alkalis). Iron- and cobalt-containing FT catalyst compositions and formulations are well known in the art. The product of a Fischer-Tropsch synthesis reaction, irrespective of catalyst used, is referred to herein as "synthetic crude."

Fischer-Tropsch Synthesis, Fischer-Tropsch Catalyst Activation and Regeneration

Both iron- and cobalt-containing catalysts must be activated prior to FT synthesis operations. As used herein, the term "activation" means activation, reductions or activation/reduction. Iron-based catalysts may be activated using hydrogen, hydrogen-carbon monoxide containing mixtures (i.e., synthesis gases), or carbon monoxide. Activation conditions are fairly mild, with temperatures in the range of 200-300° C., although temperatures up to about 400° C. have been employed in the past. The extent of reduction for iron-based catalysts need not be particularly high to achieve effective activation of the iron-based catalysts. In contrast, cobalt-containing catalysts are reduced with hydrogen gas, mixtures of hydrogen gas with inert gases such as helium or argon, or mixtures of hydrogen with small amounts of hydrocarbon gases, at temperatures in the range of 300-400° C., and the extent of reduction must be relatively high, usually more than 70-80%. For both iron and cobalt the concentration of water (which is a product of the metal reduction) in the activation vessel is generally limited or controlled, which typically involves both cooling/condensation and the use of water absorbents or dryers. In general, nickel- and ruthenium-based catalysts are more similar to cobalt-based catalysts in behavior and conditions for activation than they are to iron-based catalysts, although ruthenium-based catalysts may not require reduction promoters.

Procedures for activation of non-iron based FT catalysts require the addition of systems and equipment over that necessary for syngas conversion operations. Such systems and equipment include, for example, that needed for generation of relatively pure hydrogen, recycle compressors to minimize $H_2$ (and therefore generation rates), as well as high temperature heaters. Procedures for activation of iron based FT catalysts may also require system and equipment for relatively high concentration carbon monoxide generation and recycle. In addition, the design temperatures for the equipment in which the activation processes occur are, in general, significantly higher than that necessary for the syngas conversion processes.

For FT synthesis, iron-containing catalysts are normally employed at temperatures in the 180-300° C. range as 1-3 mm particulate particles in multi-tubular fixed bed reactors, or as 10-500 μm particles in three-phase slurry bubble column reactors (low temperature FT processes) or at temperatures in the 300-350° C. range as class "A" powders in circulating or fixed fluidized bed reactors (high temperature FT processes). Cobalt (and nickel or ruthenium) catalysts can be employed in multi-tubular fixed bed reactors, three-phase slurry bubble column reactors, and (typically as coatings on) monoliths, tube wall reactors, or microchannel reactors, all at relatively low temperatures, 180-250° C. FT-based plants employ either single stage FT reactor(s) using tail gas recycle or multiple stages once-through to achieve high overall CO conversion while limiting per pass conversions to the 50-70% range.

Additional equipment and design parameters and conditions required for FT catalyst activation processes are known in the art and are readily apparent from U.S. Pat. Nos. 4,525,206; 4,585,798; 4,605,676; 4,605,679; 4,670,414; 4,670,475; 4,717,702; 4,729,981; 4,801,573; 4,857,497; 4,962,078; 5,585,316; 6,706,661; 6,716,886; 6,753,351 and U.S. Application Publication Nos. 20040242941; 20050250863;

20070004810; 20070112080, all of which are incorporated by reference in their entirety as part of the disclosure herein.

Following activation, FT catalysts are generally pyrophoric. Thus, if the FT catalyst is not activated within the FT reactor, or at least activated locally and loaded into the reactor shortly thereafter, it is generally passivated to ease intermediate handling. Techniques for passivating the various metal-based FT catalysts as well as the equipment needed for such passivation are known in the art. U.S. Pat. Nos. 4,607,020; 4,717,702; 4,729,981; 4,863,894; 5,756,419; 5,928,985; 6,777,451; and 6,815,388 all of which are incorporated herein by reference in their entirety as part of the disclosure herein, disclose techniques and associated equipment, parameters and conditions for passivating Co, Ni, Cu, Ru, Rh, Pd, Os, Ir, Re, Pt and Fe based catalysts, including FT and/or oxygenate synthesis catalysts.

In the simplest form the FT reaction may be written as:

$$(n)CO + (2n)H_2 \rightarrow (CH_2)_n + (n)H_2O$$

where "n" ranges from 1 to as high as several hundred. The relationship between the amounts of the different carbon number ("N") products can usually be described in terms of a polymerization probability alpha ("α") with values between 0 and 1, which is written as:

$$\alpha = C_{n+1}/C_n, \text{ where } C_n \text{ and } C_{n+1} \text{ are in mole percents.}$$

Thus a plot of the natural logarithm of the mole percent of each carbon number product versus the carbon number will yield a straight line with slope −α. The products of low temperature FT processes are predominantly (>>50 mole %) normal paraffins, although olefins, alcohols, and branched paraffins may be present in smaller amounts, up to 5-10 mole %.

In addition to the FT reaction described above the water-gas-shift ("WGS") reaction may also occur. This can be written as:

$$CO + H_2O \rightarrow H_2 + CO_2$$

Iron typically has a higher activity for the WGS reaction than other FT catalytic metals; depending on the exact feed gas composition and reaction conditions, the selectivity to $CO_2$ on iron catalysts will typically range from 8-12% to as high as 40%. Except under very unusual or high (>80-85%) CO conversion conditions the $CO_2$ selectivity with cobalt catalysts is typically in the 0-2% range. The high WGS activity of iron is potentially advantageous when converting synthesis gases with $H_2/CO$ ratios lower than the stoichiometric consumption ratio of about 2.05-2.10, such as those produced from coal, coke, or biomass gasification/partial oxidation (where the $H_2/CO$ ratio of the produced synthesis gas can be as low as 0.6), as additional $H_2$ is generated in the FT reactor. The use of cobalt catalysts with such $H_2$ deficient synthesis gas feeds requires the addition of a separate (external and upstream) WGS reactor and catalyst to increase the $H_2/CO$ ratio to the stoichiometric consumption ratio; otherwise CO conversion is debited by the lack of $H_2$ and severe catalyst deactivation due to surface carbon formation may occur.

For synthesis gas feeds with $H_2/CO$ ratios in the range of 2.0 and higher, such as those produced from natural gas steam-methane or autothermal reforming or partial oxidation, the relatively high WGS activity of iron catalysts is a significant debit, as additional CO is converted to $H_2$ (and $CO_2$), which is generally not needed. Non-shifting (i.e., cobalt, ruthenium, or nickel) catalysts are strongly favored for converting natural gas based synthesis gases.

Regardless of the catalyst type and reaction conditions, as well as the reactor type, FT catalysts deactivate with time on stream. FT catalyst deactivation mechanisms can be broadly divided into two categories: those due to external causes, and those due to internal causes. External causes include the presence of catalyst poisons (contaminants) in the feed synthesis gas. These potential poisons include sulfur, mercury, arsenic, halides (especially chlorine), ammonia, and hydrogen cyanide. Internal causes include: (1) the build-up of high molecular weight ("MW") wax in the catalyst pores; (2) self-poisoning by-product organic acids; (3) build-up of hydrogen deficient, coke pre-cursor carbon deposits and/or Boudouard carbon on the catalytic metals (especially at high (er) temperature); (4) loss of catalytic metal surface area due to hydrothermal sintering; (5) oxidation of the active metals to less active or inactive oxides; (6) formation of unreactive mixed metal compounds due to reaction between the active metal and inactive support (e.g., cobalt aluminates, silicates, and/or titanates); and (7) degradation of the support due to chemical, thermal, or mechanical means such as pore collapse, material leaching, or loss of structural integrity (e.g., crushing). The rate of catalyst deactivation can vary enormously, with catalyst life ranging from several days to several years depending on reaction conditions and feed poison concentrations. The various mechanisms of FT catalyst deactivation are known in the art.

As catalyst deactivation proceeds at some rate the activity will typically reach a lower limit at which it is no longer practical to continue operations. This may occur when CO conversion (at constant feed rate and temperature), or feed rate (at constant conversion and temperature)—in other words total plant production—has dropped too low to be economic, or because temperature (at constant feed rate and conversion) has been increased to the maximum consistent with the desired product slate (i.e. maximum light hydrocarbon gas selectivity) and absence of rapid carbon formation on the catalyst surface. At such a time the catalyst can either be removed from the reactor and replaced with fresh catalyst or regenerated. Removal and replacement is more common for iron-based catalysts, which are relatively cheap but difficult to regenerate. Nevertheless, in some instances iron-based catalysts are regenerated. For example, U.S. Pat. No. 7,303, 731, the disclosure of which is incorporated herein in its entirety, discloses a method for regenerating iron-based Fischer-Tropsch catalysts. Catalyst regeneration is more common for cobalt-based, as well as the less frequently used ruthenium- and nickel-based catalysts, which are generally more expensive than iron-based catalysts and easier to regenerate. After catalyst replacement (e.g., replacement of an iron-based FT catalyst), the appropriate catalyst activation procedure is employed. In contrast, where the FT catalyst is regenerated, regeneration procedures vary from activation-type processes to more complicated, multi-step procedures. A number of FT catalyst regeneration processes are known in the art, including those discussed in U.S. Pat. Nos. 4,207,208; 4,822,824; 5,128,377; 5,260,239; 5,268,344; 5,283,216; 5,288,673; 5,389,690; 5,817,701; 5,844,005; 2,487,867; 6,022,755; 6,162,754; 6,201,030; 6,486,220; 6,878,655; 6,949,488; 4,595,703, 1986; 4,663,305; 4,670,475; 4,738, 948; 4,755,536; 4,822,824; 6,300,268; 6,455,596; 6,537,945; 6,753,286; 6,753,354; 6,800,579; 6,812,179; 6,838,487; 6,869,978; 6,900,151; 6,962,947; 6,989,403; and 2,289,731, which are all incorporated in their entirety into the disclosure herein.

Like activation processes, FT catalyst regeneration processes require additional equipment not otherwise needed for normal FT synthesis operations. In the simplest regeneration procedure—hydrogen treatment only—such additional equipment would be similar to that required for catalyst activation. Additional gas sources, vessels, and/or solids handling equipment can be required as the regeneration process complexity increases, especially for slurry bubble column reactor based systems where the small catalyst particles must be separated from the reactor liquid phase (i.e., typically the heavier fractions of the product wax). Both activation and regeneration processes may be conducted in discrete batches or continuously. Where activation and/or regeneration are conducted in discrete batches, some non-trivial level of manual operator intervention, action, and/or control is needed.

Most FT plants—existing or proposed, based on natural gas ("GTL") or coal ("CTL") feedstock—are in the size range between about 10,000 to more than 100,000 bbl/day. As used herein bbl/day capacities refer to either the FT reactor effluent or upgraded product, as upgrading process losses tend to be small, in the range of 5%. Such plants are currently land-based and in a fixed location. More recently proposed FT plants based on biomass feedstocks ("BTL") are generally smaller, in the several thousand bbl/day range based on local feedstock availability and transportation costs, and are also currently exclusively land-based.

There are also a number of generally smaller (1,000 to perhaps 15-20,000 bbl/day) proposed offshore GTL plants located on ships, FPSO's, barges, and/or drilling rigs/production platforms. There have also been a number of proposed very small ("micro") land-based FT plants, typically having 30-500 bbl/day production capacity, most of which are designed to be transportable, for example, by truck, rail, and/or helicopter. Plants in the higher end of this production range, i.e., >250 bbl/day, would require multiple modules, and are transportable with specialized means, while those at the lowest end, i.e., <<250 bbl/day, would likely fit in a single standard shipping container and could be relocated fairly easily, while the number of containers necessary for units in the middle of this range would depend on the specifics of the process design and hardware.

Oxygenate Synthesis, Oxygenate Synthesis Catalyst Activation and Regeneration

As used herein, the term oxygenate means any of (1) ethers, including, for example, ethyl tert-butyl ether (ETBE), diisopropyl ether (DIPE), dimethyl ether (DME), methyl tert-butyl ether (MTBE), tert-amyl ethyl ether (TAEE), tert-amyl methyl ether (TAME); and (2) methanol and $C_{2+}$ alcohols, including for example, ethanol (EtOH), propanol, butanol, tert-amyl alcohol (TAA), and tert-butyl alcohol (TBA). Methanol is the most common oxygenated product synthesized from syngas, while the most common catalysts for methanol synthesis are based on copper. Catalysts for higher ($C_{2+}$) oxygenate synthesis from synthesis gas are typically alkali promoted metals such as copper, zinc, molybdenum, chromium, palladium, cobalt, or rhodium, as well as mixtures of these various metals, especially cobalt and copper. Copper-based oxygenate synthesis catalysts are activated/reduced with hydrogen, much like cobalt-based FT catalysts.

Although there are a number of different oxygenate synthesis processes currently known in the art (especially for methanol synthesis), the majority of such processes utilize fixed bed reactors, whether tray, tube-shell, annular, radial, or microchannel. However, three-phase slurry methanol and/or dimethyl ether (DME) synthesis are also known.

The reactions involved in methanol synthesis can generally be described as:

$$CO + 2H_2 \rightarrow CH_3OH$$

$$CO_2 + 3H_2 \rightarrow CH_3OH + H_2O;$$

and $$CO + H_2O \rightarrow CO_2 + H_2 \text{ (WGS reaction)}$$

A stoichiometric ratio, defined as $(H_2-CO_2)/(CO+CO_2)$, of somewhat higher than 2 is preferred. In methanol synthesis processes, by-products include water and fusel oil (may include acetone, formaldehyde, ethanol, methyl formate, mimethyl ether, methylal, methyl acetate, acetaldehyde, amyl and other higher alcohols).

For higher alcohol synthesis the general reaction can be described as:

$$nCO + 2nH_2 \rightarrow C_nH_{2n+1}OH + (n-1)H_2O$$

where n is typically between 1 and about 8. Higher alcohol synthesis is generally less selective than methanol production, and a large number of competing reactions also occur. These include water-gas-shift, Fischer-Tropsch synthesis, and methanol synthesis.

Copper-based oxygenate synthesis catalysts must be activated with hydrogen, much like cobalt-based FT catalysts. In the case of copper-based oxygenate synthesis catalysts, however, the maximum reduction temperature is about 300° C. (being similar to or only somewhat higher than the usual maximum operating temperature range of about 250 to perhaps 300-350° C.). Non-copper-based oxygenate synthesis catalysts generally require activation at a minimum of 300° C., and many require temperatures as high as 350-400° C., similar to the temperature range required for activation of cobalt-based FT catalysts.

Like FT synthesis catalysts, oxygenate synthesis catalysts deactivate with time. Poisoning by feed contaminants is the primary mechanism for rapid deactivation; potential feed poisons being the same or similar to FT synthesis catalyst poisons, as is well known in the art. Sulfided oxygenate synthesis catalysts, developed primarily for higher alcohol synthesis, are typically somewhat resistant to sulfur poisoning. Methanol synthesis catalyst deactivation also occurs from thermal sintering (i.e., loss of catalytic surface area), especially at higher temperatures, and support degradation.

Methanol synthesis catalysts are typically not regenerated. If feed poison concentrations are minimized and excessive catalyst/bed temperatures are avoided conventional copper-based methanol synthesis catalysts can have a two to five year process life. However methanol synthesis catalyst regeneration procedures which are nearly identical to the hydrogen and/or oxygen-hydrogen regeneration procedures employed for FT catalyst regeneration are known.

Most existing oxygenate synthesis plants, mainly producing methanol, are smaller than FT synthesis plants, generally producing in the range of 500 to about 10,000 bbl/day FT liquids equivalent (300 million gallons per year methanol). Larger capacity oxygenate synthesis plants are also known in the art, with capacities of greater than 20,000 bbl/day. While most methanol synthesis plants use natural gas derived syngas, it is also known in the art to use coal, biomass, petroleum and/or other carbon/hydrocarbon source derived syngas. In addition, proposals for the conversion of off-shore stranded natural gas to methanol, using ship-, barge-, and/or platform-based methanol synthesis units are known.

Conventional Plant Configuration of Catalyst Activation and Regeneration

For a fixed land-based synthesis gas conversion plant (i.e., >500 bbl/day), there are a limited number of options for the location and method of the FT or oxygenate synthesis catalyst activation and regeneration facilities and processes. At one end of the spectrum is the initial shipment of new, unactivated (i.e., unreduced) catalyst from a catalyst manufacturing facility to an FT or oxygenate synthesis production plant, with the completely spent catalyst shipped out of the production plant facility (for metals reclamation and/or disposal) at the end of the catalyst's useful life. In this configuration, all required activation and/or regeneration facilities (including, for example, hydrogen generation and recovery, process gas and reactor heaters, recycle compressors, gas dryers and dryer regeneration equipment, powdered catalyst+wax mixing/slurrying devices, catalyst-wax separation devices, nitrogen and/or dilute air generation/recovery facilities) are located at the FT or oxygenate synthesis plant. At the other end of the spectrum, activated catalyst is shipped to the FT or oxygenate synthesis plant with no activation or regeneration processes conducted at the FT or oxygenate synthesis plant. In such a situation, spent catalyst may be removed from the FT or oxygenate synthesis plant and shipped to another location for regeneration, metals reclamation, and/or disposal.

There are, of course, a number of conceivable intermediate configurations between these extremes. For example, the initial charge of a slurry FT catalyst may be activated as part of the manufacturing procedure, then coated in FT wax and allowed to cool/solidify. The pre-reduced, wax encased catalyst may then be shipped to the FT or oxygenate synthesis plant and loaded into the FT or oxygenate synthesis reactor. Regardless of whether activation and/or regeneration facilities exist at the FT or oxygenate synthesis plant, pre-reduction of the initial charge of catalyst may be preferable in order to avoid commissioning local facilities long before the completion of the rest of the plant is scheduled.

Figure 1:
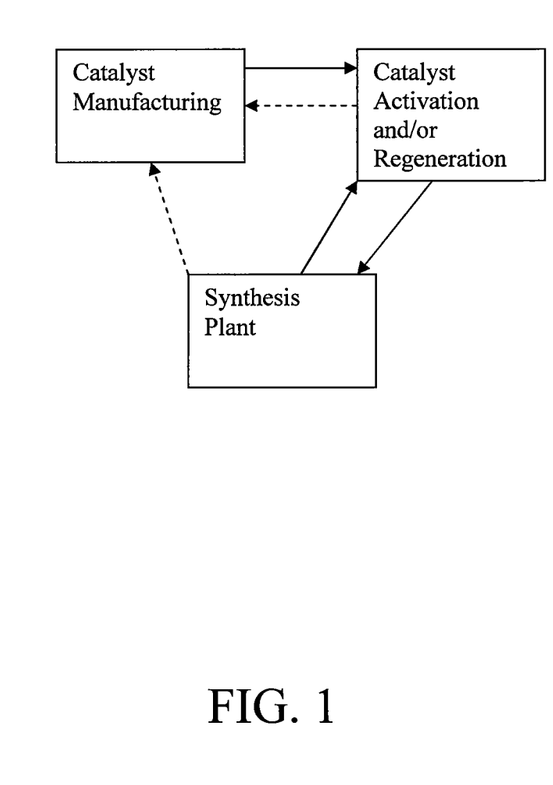
FIG. 1 is a schematic diagram illustrating the movements of catalyst in a first process used in the current state of the art.
Figure 2:
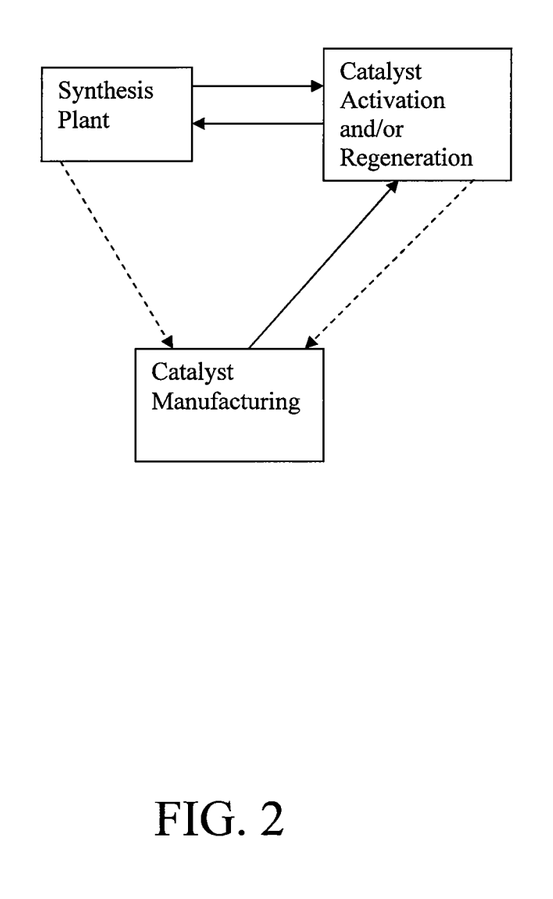
FIG. 2 is a schematic diagram illustrating the movements of catalyst in a second process used in the current state of the art.
Figure 3:
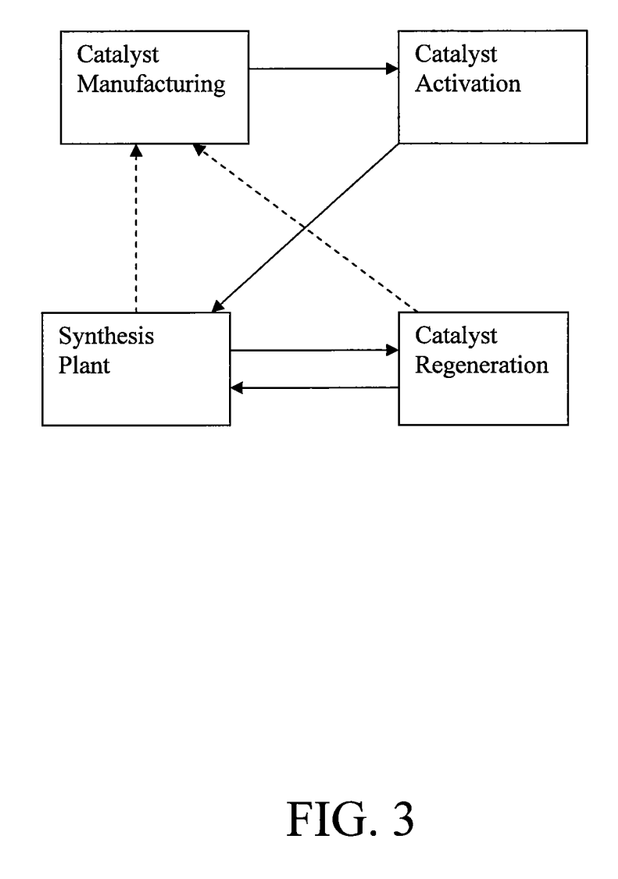
FIG. 3 is a schematic diagram illustrating the movements of catalyst in a third process used in the current state of the art.

Slurry FT catalyst hydrogen treatments require far less "extra" processing equipment and utilities than the more complicated oxidation/re-reduction regeneration processes. In some instances, it may be advantageous to conduct such hydrogen treatments at the FT or oxygenate synthesis plant, while shipping catalyst to another location for oxidation/reduction type regeneration. Currently, for FT or oxygenate synthesis plants, the catalyst manufacturing, and activation and/or regeneration facilities are in fixed locations, while catalyst is transported between them. As shown in FIG. 1 illustrating one currently known process, each of the catalyst manufacturing facility, catalyst activation and/or regeneration facility, and synthesis plant are remotely located from each other. Raw catalyst is transported from the Catalyst Manufacturing facility to the Activation and/or regeneration facility. Activated and/or regenerated catalyst is transported from the Activation and/or Regeneration Facility to the Synthesis Plant and spent catalyst is transported in the opposite direction. Spent catalyst may also be transported from the Synthesis Plant and/or Catalyst Regeneration Facility to the Catalyst Manufacturing facility for reclamation of metals (shown in FIGS. 1-3 as dashed lines). In an alternate embodiment, the Synthesis Plant is located remotely from the Catalyst Manufacturing and Activation and/or Regeneration locations. Referring to FIG. 2, a current process is shown in which the Synthesis Plant and Catalyst Activation and/or Regeneration Facility are located locally to each other but remotely from the Catalyst Manufacturing facility. In such situation, raw catalyst is transported from the Catalyst Manufacturing facility to the Catalyst Activation facility. Activated and/or regenerated catalyst is transported to the Synthesis Plant from the Catalyst Activation and/or Regeneration facility and spent catalyst is transported in the opposite direction. Spent catalyst may also be transported from either the Synthesis Plant or the Catalyst Regeneration facility to the Catalyst Manufacturing facility for metals reclamation. FIG. 3 illustrates a currently known process in which the Synthesis Plant and Catalyst Regeneration facility are located locally to each other but remotely from the Catalyst Manufacturing and Activation Facilities. As shown in FIG. 3, the catalyst, spent, activated and regenerated is transported between stationary facilities and plants. The distances between these facilities varies from a few miles (or less—if located at the same facility) to thousands of miles, depending primarily on whether the activation and/or regeneration facilities are located at the FT and/or oxygenate synthesis production facility ("synthesis plant"), and whether the synthesis plant is located in a generally developed, commercial area. As seen in FIGS. 1-3, in all known situations, however, the synthesis plant and the catalyst manufacturing, activation and/or regeneration facilities are in fixed locations, while catalyst is transported between them.

The more difficult and/or time consuming the removal of synthesis catalyst from the synthesis reactors is, the more likely the preferred configuration is to perform activation or regeneration treatments in the synthesis reactor itself. Catalyst addition and removal is easiest in the fluidized and slurry bed reactors, difficult but not impossible in particulate catalyst fixed-bed reactors, and extremely difficult in monolith, tube wall, or microchannel reactors with catalyst coatings. Moreover, the more frequently the synthesis catalyst must be activated and/or regenerated, the more desirable it is to conduct such activation and/or regeneration locally at the FT and/or oxygenate synthesis production plant.

Movable Plant Configuration of Catalyst Activation and Regeneration

For currently-proposed movable, predominantly offshore, plants practical options for the location and method of the FT or oxygenate synthesis catalyst activation and regeneration facilities are much the same as for conventional land-based synthesis plants. A preferred solution, however, is shifted strongly towards locating complicated, infrequently used equipment—such as that required for the oxidation/reduction-type catalyst regenerations—to a location other than the synthesis production plant, such as the catalyst manufacturing plant. Such preference is due to the significant plot plan limitations and/or costs associated with increased plot plan in movable facilities, e.g., FPSOs and barges. In addition, the production capacity of proposed movable synthesis plants are significantly less than that of conventional, land-based plants. Therefore, equipment associated with catalyst activation and/or regeneration constitutes a larger fraction of the total plant capital cost.

SUMMARY OF EMBODIMENTS OF THE INVENTION

A first embodiment of the invention provides a process for catalyst treatment comprising loading a Fischer-Tropsch synthesis catalyst into a Fischer-Tropsch production unit comprising a synthesis gas production reactor and a Fischer-Tropsch synthesis reactor wherein the Fischer-Tropsch production unit is located at a catalyst treatment facility; activating the Fischer-Tropsch synthesis catalyst in the Fischer-Tropsch synthesis reactor; and transporting the Fischer-Tropsch production unit to a production location wherein a feedstock for the synthesis gas production reactor is available.

In some aspects of the invention, the process further comprises operating the Fischer-Tropsch production unit after activating the Fischer-Tropsch synthesis catalyst in the Fischer-Tropsch synthesis reactor and before transporting the Fischer-Tropsch production unit to a production location wherein a feedstock for the synthesis gas production reactor is available. In yet other aspects of the invention, the process further includes: operating the Fischer-Tropsch production unit at the production location; and transporting the Fischer-Tropsch production unit to the catalyst treatment facility. In yet other aspects, the inventive process further includes treating the Fischer-Tropsch synthesis catalyst. Such treating includes one or more of: removing the Fischer-Tropsch synthesis catalyst from the Fischer-Tropsch synthesis reactor and adding new Fischer-Tropsch synthesis catalyst to the Fischer-Tropsch synthesis reactor; and (ii) regenerating the Fischer-Tropsch synthesis catalyst in the Fischer-Tropsch synthesis reactor.

In some embodiments of the invention, the Fischer-Tropsch synthesis reactor is a multi-tubular fixed bed, monolith reactor, or microchannel reactor. In yet other embodiments, the Fischer-Tropsch synthesis reactor is a slurry bubble column reactor or fixed fluidized bed reactor. In some embodiments, the Fischer-Tropsch catalyst is a cobalt-based, iron-based catalyst, or a mixture thereof.

Another embodiment of the invention provides a process for treating a catalyst treatment including: loading an oxygenate synthesis catalyst into an oxygenate synthesis reactor; activating the oxygenate synthesis catalyst in the oxygenate synthesis reactor; and transporting the oxygenate synthesis reactor to an oxygenate production unit located at a production location wherein a feedstock for the synthesis gas production reactor is available.

Some embodiments of the invention the oxygenate production unit is operated after activating the oxygenate synthesis catalyst in the oxygenate synthesis reactor; and before transporting the oxygenate synthesis reactor to an oxygenate production unit located at a production location wherein a feedstock for the synthesis gas production reactor is available. Yet other embodiments of the invention further include operating the oxygenate synthesis reactor at the production location; and transporting the oxygenate synthesis reactor to the catalyst treatment facility.

Some embodiments further include treating the oxygenate synthesis catalyst. Such treating may include one or more of: removing the oxygenate synthesis catalyst from the oxygenate synthesis reactor and adding new oxygenate synthesis catalyst to the oxygenate synthesis reactor; and regenerating the oxygenate synthesis catalyst in the oxygenate synthesis reactor.

In some embodiments of the inventive process the oxygenate synthesis reactor may be one or more of a fixed bed, monolith reactor, microchannel reactor, a three-phase slurry reactor and a fluidized bed reactor. In some embodiments of the invention, the oxygenate synthesis catalyst comprises a copper-based catalyst, a cobalt-based catalyst or a mixture thereof. In yet other embodiments of the invention, the synthesis gas production reactor is a steam-methane reforming reactor, a carbon dioxide reforming reactor, or a combination thereof. In alternative embodiments, the synthesis gas production reactor is a autothermal reformer, thermal partial oxidation, catalytic partial oxidation reactor, or a combination thereof.

In preferred embodiments of the invention, the feedstock for the synthesis gas production reactor is natural gas, resid, coke, bitumen, coal, biomass or a combination thereof.

In some embodiments of the invention, the synthesis gas production reactor is a steam-methane reforming reactor, a carbon dioxide reforming reactor, or a combination thereof. In yet other embodiments, the synthesis gas production reactor is a autothermal reformer, thermal partial oxidation, catalytic partial oxidation reactor, or a combination thereof. In some embodiments, the feedstock for the synthesis gas production reactor is natural gas, resid, coke, bitumen, coal, biomass or a combination thereof.

Yet another embodiment of the invention provides a process for treating a catalyst utilizing a modular, portable catalyst activation unit comprising: transporting a modular, portable catalyst activation unit to a Fischer-Tropsch and/or oxygenate synthesis production unit; and activating a Fischer-Tropsch and/or oxygenate synthesis catalyst with the modular, portable catalyst activation unit.

Some embodiments provide a process for treating a catalyst utilizing a modular, portable catalyst regeneration unit comprising: transporting a modular, portable catalyst regeneration unit to a Fischer-Tropsch and/or oxygenate synthesis production unit comprising a Fischer-Tropsch and/or oxygenate synthesis reactor; and regenerating the Fischer-Tropsch and/or oxygenate synthesis catalyst with the modular, portable catalyst regeneration unit. In some aspects of the invention, the regenerating occurs in the Fischer-Tropsch and/or oxygenate synthesis reactor. In some embodiments, the process further includes removing a Fischer-Tropsch or oxygenate synthesis catalyst from the Fischer-Tropsch and/or oxygenate synthesis reactor and loading the catalyst into the modular, portable catalyst regeneration unit following the step of transporting a modular, portable catalyst regeneration unit to a Fischer-Tropsch and/or oxygenate synthesis production unit comprising a Fischer-Tropsch and/or oxygenate synthesis reactor and before the step of regenerating the Fischer-Tropsch and/or oxygenate synthesis catalyst with the modular, portable catalyst regeneration unit. In some embodiments, the Fischer-Tropsch or oxygenate synthesis catalyst from the Fischer-Tropsch or oxygenate synthesis reactor and loading the catalyst into the modular, portable catalyst regeneration unit is accomplished without exposing the Fischer-Tropsch synthesis catalyst to the environment.

In some embodiments, the modular, portable catalyst activation unit comprises hydrogen (and/or other gas) generation and purification equipment, one or more recycle compressors, one or more gas dryers, one or more electric and/or fired heaters, hot oil (or other heat transfer fluid) heating and cooling systems, circulation pumps, heat exchangers, a control system. In some embodiments, the modular, portable catalyst regeneration unit comprises hydrogen (and/or other gas) generation and purification equipment, one or more recycle compressors, one or more gas dryers, one or more electric and/or fired heaters, hot oil (or other heat transfer fluid) heating and cooling systems, circulation pumps, heat exchangers, a control system. In a preferred embodiment, the modular, portable catalyst activation unit is sized to fit within a standard shipping container.

Some embodiments of the invention provide an improvement in a process for producing oxygenates from synthesis gas utilizing an oxygenate synthesis reactor located at an oxygenate production facility, the improvement comprising transporting a modular, portable oxygenate catalyst activation and/or regeneration unit to the oxygenate production facility; and activating and/or regenerating the oxygenate synthesis catalyst using the modular, portable oxygenate catalyst activation and/or regeneration unit. In some embodiments, the activating and/or regenerating step occurs in the oxygenate synthesis reactor. Some embodiments further include removing an oxygenate synthesis catalyst from the oxygenate synthesis reactor and loading the oxygenate synthesis catalyst into the modular, portable oxygenate catalyst activation and/or regeneration unit following the transporting step and before the activating and/or regenerating step. In some embodiments, the steps of removing the oxygenate synthesis catalyst from the oxygenate synthesis reactor and loading the oxygenate synthesis catalyst into the modular, portable oxygenate catalyst activation and/or regeneration unit is accomplished without exposing the oxygenate synthesis catalyst to the environment.

Another embodiment of the invention provides an improvement in a process for producing synthetic crude from synthesis gas utilizing a Fischer-Tropsch synthesis reactor located at an Fischer-Tropsch production facility, the improvement comprising transporting a modular, portable Fischer-Tropsch catalyst activation and/or regeneration unit to the Fischer-Tropsch production facility; and activating and/or regenerating the Fischer-Tropsch synthesis catalyst using the modular, portable Fischer-Tropsch catalyst activation and/or regeneration unit. In some embodiments, the activating and/or regenerating step occurs in the Fischer-Tropsch synthesis reactor. Some embodiments further include removing an Fischer-Tropsch synthesis catalyst from the Fischer-Tropsch synthesis reactor and loading the Fischer-Tropsch synthesis catalyst into the modular, portable Fischer-Tropsch catalyst activation and/or regeneration unit following the transporting step and before the activating and/or regenerating step. In some embodiments, the steps of removing an Fischer-Tropsch synthesis catalyst from the Fischer-Tropsch synthesis reactor and loading the Fischer-Tropsch synthesis catalyst into the modular, portable Fischer-Tropsch catalyst activation and/or regeneration unit is accomplished without exposing the Fischer-Tropsch synthesis catalyst to the environment.

Another embodiment of the invention provides an improvement in a process for producing synthetic crude from synthesis gas utilizing a Fischer-Tropsch production unit comprising a Fischer-Tropsch synthesis reactor, the improvement comprising loading a Fischer-Tropsch synthesis catalyst into the Fischer-Tropsch synthesis reactor wherein the Fischer-Tropsch production unit is located at a catalyst treatment facility, activating the Fischer-Tropsch synthesis catalyst in the Fischer-Tropsch synthesis reactor; and transporting the Fischer-Tropsch production unit to a production location.

Another embodiment of the invention provides an improvement in a process for producing one or more oxygenates from synthesis gas utilizing an oxygenate production unit comprising an oxygenate synthesis reactor, the improvement comprising loading an oxygenate synthesis catalyst into the oxygenate synthesis reactor wherein the oxygenate production unit is located at a catalyst treatment facility, activating the oxygenate synthesis catalyst in the oxygenate synthesis reactor; and transporting the oxygenate production unit to a production location.

Another embodiment of the invention provides an improvement in a process for producing synthetic crude from synthesis gas utilizing a Fischer-Tropsch synthesis reactor, the improvement comprising: (a) loading the Fischer-Tropsch synthesis catalyst into the Fischer-Tropsch synthesis reactor wherein the Fischer-Tropsch synthesis reactor is located at a catalyst treatment facility; (b) activating the Fischer-Tropsch synthesis catalyst in the Fischer-Tropsch synthesis reactor; and (c) transporting the Fischer-Tropsch synthesis reactor to a Fischer-Tropsch production unit comprising a synthesis gas production reactor wherein the Fischer-Tropsch production unit is located at a location wherein a feedstock for the synthesis gas production reactor is available. Some embodiments further include: (d) removing the Fischer-Tropsch synthesis reactor from the Fischer-Tropsch synthesis production unit; (e) transporting the Fischer-Tropsch synthesis reactor to a Fischer-Tropsch catalyst regeneration facility comprising a catalyst regeneration unit; (f) regenerating the Fischer-Tropsch synthesis catalyst with the regeneration unit; and (g) transporting the Fischer-Tropsch synthesis reactor with regenerated Fischer-Tropsch synthesis catalyst to a Fischer-Tropsch production facility. In some embodiments, the Fischer-Tropsch production facility is the Fischer-Tropsch synthesis production unit. In some embodiments, the improvement of further includes: removing the Fischer-Tropsch synthesis catalyst from the Fischer-Tropsch synthesis reactor following step (e) and before step (f); and filling the Fischer-Tropsch synthesis reactor with a regenerated Fischer-Tropsch synthesis catalyst after step (f) and before step (g). In some embodiments, the removing and filling steps are accomplished without exposing the catalyst to the environment.

Another embodiment of the invention provides an improvement in a process for producing synthetic crude from synthesis gas utilizing an oxygenate synthesis reactor, the improvement comprising: (a) loading an oxygenate synthesis catalyst into the oxygenate synthesis reactor wherein the oxygenate synthesis reactor is located at a catalyst treatment facility; (b) activating the oxygenate synthesis catalyst in the oxygenate synthesis reactor; and (c) transporting the oxygenate synthesis reactor to an oxygenate production unit comprising a synthesis gas production reactor wherein the oxygenate production unit is located at a location wherein a feedstock for the synthesis gas production reactor is available. In some embodiments, the improvement further includes: (d) removing the oxygenate synthesis reactor from the oxygenate synthesis production unit; (e) transporting the oxygenate synthesis reactor to an oxygenate catalyst regeneration facility comprising a catalyst regeneration unit; (f) regenerating the oxygenate synthesis catalyst with the regeneration unit; and (g) transporting the oxygenate synthesis reactor with regenerated oxygenate synthesis catalyst to an oxygenate production facility. In some embodiments, the oxygenate production facility is the oxygenate synthesis production unit. In some embodiments, the improvement further includes: removing the oxygenate synthesis catalyst from the oxygenate synthesis reactor following step (e) and before step (f); and filling the oxygenate synthesis reactor with a regenerated oxygenate synthesis catalyst after step (f) and before step (g). In some embodiments, the removing and filling steps are accomplished without exposing the catalyst to the environment.

Another embodiment of the invention provides an improvement in a process for producing synthetic crude from synthesis gas utilizing a Fischer-Tropsch synthesis reactor, the improvement comprising: (a) loading the Fischer-Tropsch synthesis catalyst into a catalyst compartment wherein the catalyst compartment is located at a catalyst treatment facility; (b) activating the Fischer-Tropsch synthesis catalyst in the catalyst compartment; (c) transporting the catalyst compartment to a Fischer-Tropsch production unit comprising a Fischer-Tropsch synthesis reactor and a synthesis gas production reactor wherein the Fischer-Tropsch production unit is located at a location wherein a feedstock for the synthesis gas production reactor is available; and (d) loading the catalyst compartment into the Fischer-Tropsch synthesis reactor. In some embodiments, the improvement further includes: (e) removing the catalyst compartment from the Fischer-Tropsch synthesis reactor; (f) transporting the catalyst compartment to a Fischer-Tropsch catalyst regeneration facility comprising a catalyst regeneration unit; (g) regenerating the Fischer-Tropsch synthesis catalyst with the regeneration unit; and (h) transporting the catalyst compartment with regenerated Fischer-Tropsch synthesis catalyst to a Fischer-Tropsch production facility comprising a Fischer-Tropsch synthesis reactor. In some embodiments, the Fischer-Tropsch production facility is the Fischer-Tropsch synthesis production unit. In some embodiments, the improvement further includes: removing the Fischer-Tropsch synthesis catalyst from the catalyst compartment following step (f) and before step (g); and filling the catalyst compartment with a regenerated Fischer-Tropsch synthesis catalyst after step (g) and before step (h). In some embodiments, the removing and filling steps are accomplished without exposing the catalyst to the environment.

Another embodiment of the invention provides an improvement in a process for producing synthetic crude from synthesis gas utilizing an oxygenate synthesis reactor, the improvement comprising: (a) loading an oxygenate synthesis catalyst into catalyst compartment wherein the catalyst compartment is located at a catalyst treatment facility; (b) activating the oxygenate synthesis catalyst in the catalyst compartment; (c) transporting the catalyst compartment to an oxygenate production unit comprising an oxygenate synthesis reactor and a synthesis gas production reactor wherein the oxygenate production unit is located at a location wherein a feedstock for the synthesis gas production reactor is available; and (d) loading the catalyst compartment into the oxygenate synthesis reactor. In some embodiments, the improvement further includes: (e) removing the catalyst compartment from the oxygenate synthesis reactor; (f) transporting the catalyst compartment to an oxygenate catalyst regeneration facility comprising a catalyst regeneration unit; (g) regenerating the oxygenate synthesis catalyst with the regeneration unit; and (h) transporting the catalyst compartment with regenerated oxygenate synthesis catalyst to an oxygenate production facility comprising an oxygenate synthesis reactor. In some embodiments, the oxygenate production facility is the oxygenate synthesis production unit. In some embodiments, the improvement further comprises: removing the oxygenate synthesis catalyst from the catalyst compartment following step (f) and before step (g); and filling the catalyst compartment with a regenerated oxygenate synthesis catalyst after step (g) and before step (h): In some embodiments, the removing and filling steps are accomplished without exposing the catalyst to the environment.

Another embodiment of the invention provides a process for catalyst treatment comprising: (a) loading a synthesis catalyst into a production unit comprising a synthesis gas production reactor and a synthesis reactor wherein the production unit is located at a catalyst treatment facility; (b) activating the synthesis catalyst in the synthesis reactor; and (c) transporting the production unit to a production location wherein a feedstock for the synthesis gas production reactor is available; wherein the synthesis reactor produces one or more Fischer-Tropsch products and one or more oxygenates. In some embodiments, the synthesis reactor is a multi-tubular fixed bed, monolith reactor, or microchannel reactor. In other embodiments, the synthesis reactor may be a slurry bubble column reactor or fixed fluidized bed reactor. In some embodiments, the catalyst is a cobalt-based, copper-based, iron-based catalyst, or a mixture of any thereof. In some embodiments, the synthesis gas production reactor is a steam-methane reforming reactor, a carbon dioxide reforming reactor, or a combination thereof. In some embodiments, the synthesis gas production reactor is a autothermal reformer, thermal partial oxidation, catalytic partial oxidation reactor, or a combination thereof. In a preferred embodiment, the feedstock for the synthesis gas production reactor is natural gas, resid, coke, bitumen, coal, biomass or a combination thereof. In some embodiments, the process further includes operating the production unit after step (b) and before step (c). Some embodiments further include: (d) operating the production unit at the production location; and (e) transporting the production unit to the catalyst treatment facility. Some embodiments further comprise treating the synthesis catalyst wherein the treating is selected from the group of (i) removing the synthesis catalyst from the synthesis reactor and adding new synthesis catalyst to the Fischer-Tropsch synthesis reactor; and (ii) regenerating the synthesis catalyst in the synthesis reactor.

DETAILED DESCRIPTION OF THE INVENTION

Micro-Scale FT and Oxygenate Synthesis Plants

There are proposed micro-scale FT and oxygenate synthesis plants. In general, such plant capacities range from: (1) from about of 500 to about 1000 Mscfd natural gas feed rates, which are equivalent to from about 30 to about 100 bbl/day hydrocarbon liquids production capacity; or (2) about 1 to about 10 MMscfd, which are equivalent to from about 70 to about 1,000 bbl/day hydrocarbon liquids production capacity. There is in principle no reason that technically viable units could not be smaller still, in the range of 100-500 Mscfd (ca. 10-50 bbl/day); minimum size is strictly a function of economic viability.

There are a number of constraints on the economic viability of plants at this micro-scale. The most recent commercial conventional GTL plants actually constructed cost in the range of $950 million for 34,000 bbl/day FT liquid, or about $28,000 per bbl/day capacity. More recently engineering, procurement, and construction ("EPC") costs have increased such that currently forecasted GTL capital costs for plants to be constructed in the near future are in the range of $50,000 per bbl/day for similarly sized conventional plants. As plant size is increased from $S_1$ to $S_2$, the ratio of costs increases nonlinearly, i.e., by some power other than 1. For example, consider two conventional facilities having different capacities, $S_1$ and $S_2$. The cost of the second facility ($C_2$) may be determined using a "scale factor" and the cost of the first facility ($C_1$), according to the formula, $C_2=C_1*(S_2/S_1)^n$, where "n" is the scale factor. For n<1, costs rise at less than the ratio of plant size/capacity, so unit cost decreases yielding what is referred to as "economies of scale". At a conventional plant scale factor of 0.6 these cost projections suggest that a 50-100 bbl/day unit would cost in the range of $19-29 million (at $28,000 per bbl/day for the larger, conventional unit) to $34-51 million (at $50,000 per bbl/day). Using the more recent specific capital cost prediction of $50,000 per bbl/day capacity, and assuming a $50/bbl product price, the ratio of plant capital cost to total plant yearly revenue would vary from about 3.0 for a 34,000 bbl/day plant to 31 at 100 bbl/day and 40 at 50 bbl/day. Even with zero costs for operating and maintenance (all revenue is profit) the time to payback initial investment on such micro-scale plants would clearly be longer than the typical plant lifespan of 20-30 years. With the same $50/bbl product value assumption, actual total yearly revenues for these micro-scale 50-100 bbl/day plants would range from about $850,000 to $1,600,000. Thus, to achieve economic feasibility, plant capital investment costs for these micro-scale plants must be significantly lower than the values predicted from large plant configurations, approaching a factor of 10 (or more) times lower, and annual total operating and maintenance costs must be much lower than the relatively small total annual revenue stream.

To achieve these economic targets, certain changes to conventional plants are required. On the capital cost side, the process may be simplified, with the number of unit operations minimized. The number of vessels, instruments, and rotating equipment should be minimized. Plants are preferably not individually designed and engineered, but rather are engineered as a small number of standard designs that may be mass produced. The units may be shop fabricated, modular, and fit within normal truck bed shipping size constraints, e.g., 8 ft.×10 ft.×40 ft., and less than about 20 tons total weight. Alternatively, a single processing unit may be shop fabricated in more than one module, depending on targeted capacity. For the very exothermic syngas generation and FT/oxygenate synthesis processes, heat exchanger size may be minimized, utilizing, for example, advanced finned tube designs. In some instances, utilities that are absolutely required (typically electrical power and boiler feed water/steam systems) may be applied as widely as possible, minimizing the number of different utilities included in the plant package.

Operating costs may also be subject to similar constraints. In some instances, the plants may be highly, if not completely, automated. In other instances, the automated control systems may be capable of remote monitoring and control. In some instances, feed costs may be minimized, by use, for example, of stranded and/or non-pipeline standard (sub-quality) natural gas, most types of coal, and/or waste-stream biomass (including but not limited to, poultry litter, sawmill wastes, agricultural residues, (Kraft paper process) black liquor, municipal solid waste).

Maintenance frequency and costs may also be minimized by judicious equipment selection and process design and layout. In some instances, connections are welded (to avoid leaks associated with gaskets and fittings) except where maintenance constraints dictate flanges or other non-welded connections. Small-scale materials of construction considerations will typically lead to "alloying up" to FeCr (or higher) alloys, compared to the more common large plant carbon steels.

Micro-Scale FT and Oxygenate Synthesis Plants—Syngas Generation

In preferred embodiments, SMR-based syngas generation is used over the more conventionally preferred ATR and CPOX syngas generation processes. In some embodiments, compact or gas-heated reforming, or a more advanced, process intensified or microchannel type design SMR process is used to produce the syngas. In other embodiments, a conventional fired packed tube reformer may be used. In some instances, moderate to fairly high $CO_2$ concentrations (up to 40%) in the feed natural gas are used for SMR-based syngas generation to decrease the $H_2/CO$ in the product syngas. In other instances natural gas feeds containing moderate to fairly high inert gas (i.e. nitrogen, argon, or helium) concentrations are used for syngas generation. Generally, removal of sulfur, halogens (e.g., fluorine, chlorine, bromine) and heavy metals (e.g., lead, arsenic, etc.) from the natural gas feed is preferred to improve prereformer, reformer, and/or downstream synthesis catalyst life. In some embodiments, especially for coal or biomass gasification based processes, the produced syngas is treated for particulates (e.g., carbon) removal. In other embodiments ATR and/or CPOX syngas generation processes are utilized in conjunction with Oxygen (Ion) Transport Membrane (OTM or ITM) reactors. In some embodiments, the produced syngas is not treated for removal of nitrogen compounds, such as ammonia or hydrogen cyanide. In such instances, FT and/or oxygenate synthesis operations with somewhat depressed catalyst activities are conducted. In some embodiments, the produced syngas is treated with membrane and/or pressure swing adsorption ("PSA") treatment to remove excess hydrogen removal prior to passage to the FT synthesis reactor.

Micro-Scale FT and Oxygenate Synthesis Plants—FT and/or Oxygenate Synthesis

In some embodiments, multi-tubular fixed bed, monolith, and/or microchannel type reactors are preferred for FT and/or oxygenate synthesis. In some micro-scale plants, fixed bed-type reactors are preferred. In preferred embodiments of a micro-scale FT and/or oxygenate synthesis plant, smaller tube diameters, typically in the range of about ⅜ to about 1.0 inch inside diameter ("ID") are used, preferably about ¾ inch. For natural gas based FT synthesis processes, cobalt-based catalysts are used in some embodiments.

For both FT and oxygenate synthesis, the exact choice of fixed-bed reactor type (e.g., conventional fixed bed, monolith, microchannel) may be determined by overall cost. In alternative embodiments, a single reactor operated with tail gas recycle or multiple reactors in series operated once-through may be used. In a most preferred embodiment for FT synthesis, a "chain limiting" catalyst is used to produce an almost completely ambient temperature liquid product.

Micro-Scale FT and Oxygenate Synthesis Plants—FT Product Upgrading

In preferred embodiments of a micro-scale FT plant, FT synthesis product upgrading process includes addition of the raw FT liquid products (wax and $C_{5+}$ liquids) to an existing crude oil pipeline. In other embodiments, the raw FT liquid products are transported to a larger, centralized FT product upgrading facility. Such centralized FT product upgrading facility may be an existing, conventional refinery or chemical plant or an FT products upgrading facility dedicated to processing FT synthesis product from a number of micro-scale FT units, for example in a common geographical area. In alternative instances, a simplified, low conversion once-through wax hydrocracking unit is included in the micro-scale FT synthesis plant to produce a final product containing only ambient temperature liquids.

In some embodiments, the FT product water stream, which contains hydrocarbons (about 2% with cobalt-based catalysts and up to about 5% with iron-based catalysts) mainly in the form of light alcohols, can be steam stripped and fed back into the front end syngas generation process as steam using excess low level heat available in the process.

Micro-Scale FT and Oxygenate Synthesis Plants—Oxygenate Product Upgrading

The raw product from methanol synthesis reactors typically contains from about 10% to about 35% water and small (<<5%) amounts of other light oxygenates and heavier FT type products. The raw methanol synthesis product could be used locally, or shipped and sold "as is," purified to a commercial methanol specification (e.g., fuel grade methanol specifications are about >97% methanol, with up to about 1 wt % water content; chemical grade AA methanol contains about >99.85% methanol and about <0.1 wt % water), or converted to other products, such as DME, gasoline, olefins, or chemicals. In preferred embodiments, the raw methanol synthesis product is purified by distillation to fuel grade methanol for local use or sale. In other preferred embodiments, the raw methanol synthesis product is converted to DME. In yet other embodiments, the raw methanol synthesis product is purified to chemical grade methanol or converted to gasoline or olefins. In cases where at least some of the synthesis product water is separated from the desired oxygenate and/or hydrocarbon product it will generally be advantageous to re-use this water as make-up water for feed steam to the synthesis gas generation process. As in the case of FT product upgrading, raw methanol synthesis product may alternatively be transported to and upgraded in larger plants designed to handle the production from a number of micro-scale units, for example in a specific geographical location.

The raw products of higher alcohol or oxygenate synthesis processes are generally a more complicated mixture of alcohols of various carbon numbers, other oxygenates, and FT type hydrocarbons. In some instances, such raw products of higher alcohol or oxygenate synthesis processes are upgraded as described in connection with raw methanol synthesis product. In other embodiments, raw products of higher alcohol or oxygenate synthesis processes are sold "as is."

Micro-Scale FT and Oxygenate Synthesis Plants—Activation and/or Regeneration of FT and Oxygenate Synthesis Catalysts The activation and regeneration processes required for FT and/or oxygenate synthesis catalysts can be characterized as: (1) performed relatively infrequently; (2) often requiring substantial additional equipment beyond that required for normal operations (especially for regeneration), and (3) typically operated in batch, rather than continuous, operating mode.

For example, activation of cobalt-based FT catalysts (and most oxygenate synthesis catalysts other than copper-based catalysts) typically requires hydrocarbon-, CO— and $CO_2$—free hydrogen, hydrogen recycle and drying, and significantly higher temperatures than those employed in normal synthesis operations. Standard copper based methanol synthesis catalysts, on the other hand, typically require reduction in dilute (1-10%) hydrogen in nitrogen, methane, or other relatively inert (CO free) gas to temperatures in the same range as those employed in normal methanol synthesis operations. In addition, catalyst activation is performed initially and then only following a re-oxidation step, such as that employed in many regeneration processes. In some cases, e.g., copper-based methanol catalyst and some cobalt-based FT catalysts, activation is only performed once during the life cycle of the catalyst. In some circumstances, however, such as inadvertent exposure of the FT and/or oxygenate catalyst to oxygen during plant shutdowns and/or maintenance (especially for Cu based methanol synthesis catalysts), the catalyst may require additional activation procedures subsequent to the initial activation.

Of the catalyst regeneration processes considered earlier, only the mild (synthesis temperature) hydrogen treatments sometimes practiced with cobalt-based FT and copper based methanol catalysts do not automatically require substantial additional process equipment, and even these may include additional facilities for hydrogen generation and/or purification, as well as recycle compression.

The conventional alternative to including activation/reduction and/or regeneration facilities as part of the synthesis plant facilities is to conduct these steps at some other location (typically a catalyst production facility), shipping catalyst back and forth between the synthesis and the activation and/or regeneration facilities. This procedure is problematic for micro-scale plants for reasons involving the details of the synthesis catalyst/reactor combinations and the tight constraints on unit capital and operating costs discussed above.

Catalyst addition and removal are simplest in fluidized and slurry bubble column reactors. Considering first the fluidized bed reactors, the iron catalysts that are employed typically have total life spans of less than 6 months due to both deactivation and (attrition related) loss of catalyst fines. The large solids handling systems necessary for operation typically require constant or near constant operator coverage. Similarly the catalyst in the fluidized bed settles (defluidizes) on loss of feed, requiring introduction of continuous (recycled) purge gas and/or operator intervention on unit shutdowns or trips. For these reasons micro-scale application of high temperature fluidized bed synthesis processes can probably be ruled out. Finally the very high light hydrocarbon gas ($C_1$-$C_4$) typical of high temperature FT—typically in the range of 30-40% is a significant debit for a plant based on stranded natural gas, although this would not at all necessarily be the case for a coal or biomass unit, which might easily be located on a non-remote site.

Catalyst addition and removal are also simple in slurry bubble column reactors. Activated catalyst can be coated in wax which, after cooling and solidification, serves to protect the reduced metal from re-oxidation. Solid catalyst-wax particles, pellets, or blocks can be readily transported between catalyst manufacturing/activation and synthesis production plant sites. Slurry bubble column reactors are, however, subject to de-fluidization and catalyst settling on loss of feed gas, in much that same way as fluidized bed reactors. On loss of feed, gas flow to these reactors must be maintained (typically an inert gas on recycle), at least until the reactor contents can be transferred to a dedicated holding vessel. Catalyst-wax separation in slurry reactor FT synthesis is typically accomplished by filtration, which generally requires intensive human intervention, especially on start-up and shutdown.

Catalyst addition and removal from fixed bed reactors (especially multi-tubular fixed beds) is much more difficult than for slurry bubble column or fluidized bed reactors. This process entails opening the reactor vessel—typically by removing the top and/or bottom heads or opening an axial "man way"—and either draining by gravity or vacuuming out the catalyst particles, and requires that the reactor be completely shutdown, cooled to (near) ambient temperature, and completely purged of all hydrocarbons and synthesis gases. This may be problematic and require specialized equipment in the preferred modular plant design, but is the normal procedure for initial reactor catalyst loading and subsequent replacement of the entire catalyst charge; it is impractical for catalyst regeneration procedures that must be performed more frequently. Catalyst loading in a multi-tubular fixed bed reactor—particularly with small diameter tubes—is especially difficult and time consuming. Transfer of pre-reduced catalyst from a manufacturing site to the remote synthesis plant, while at least theoretically possible, is fraught with difficulty. When reduced, both cobalt (FT) and copper (methanol and higher alcohol) catalysts are extremely pyrophoric on exposure to air. Thus they must either be shipped and loaded under completely inert gas (oxygen free) conditions, or be coated or treated in some way to prevent re-oxidation on exposure to air. Coating with FT wax is the most effective method of preventing re-oxidation, but loading small (about 1 mm) fixed bed catalyst particles that are wax coated is much more difficult that handling slurry bubble column reactor catalyst-wax mixtures, and cannot be practiced with alcohol synthesis catalysts. Mild surface oxidation or coating (passivation) has been practiced successfully, but is still difficult and requires great care in subsequent handling and loading. The activated catalyst must then still be loaded in the reactor in the (remote) field. While loading, handling, and removing reduced/activated catalyst is clearly not impossible, it is much preferable to load, handle, and remove only oxidized materials, while conducting activation/reduction and regeneration inside the reactor vessel.

Catalyst addition and removal is significantly more difficult in process intensification-type (monolith, plate-tube, finned tube, or microchannel) reactors. In such devices the catalyst is typically coated onto part of the reactor structure itself, and cannot be practically removed except at the end of its useful life. Depending on the reactor and unit module designs, access to the reactor in the field may or may not practical. At least one proposed microchannel design the catalyst is actually small (about 250 μm) discrete particles loaded into the process microchannels much like a miniature fixed bed, and its loading/unloading characteristics would be expected to behave similarly to conventional fixed beds as described above. For the majority of these reactor types activation and regeneration can only be performed while the catalyst is in the reactor.

Figure 4:
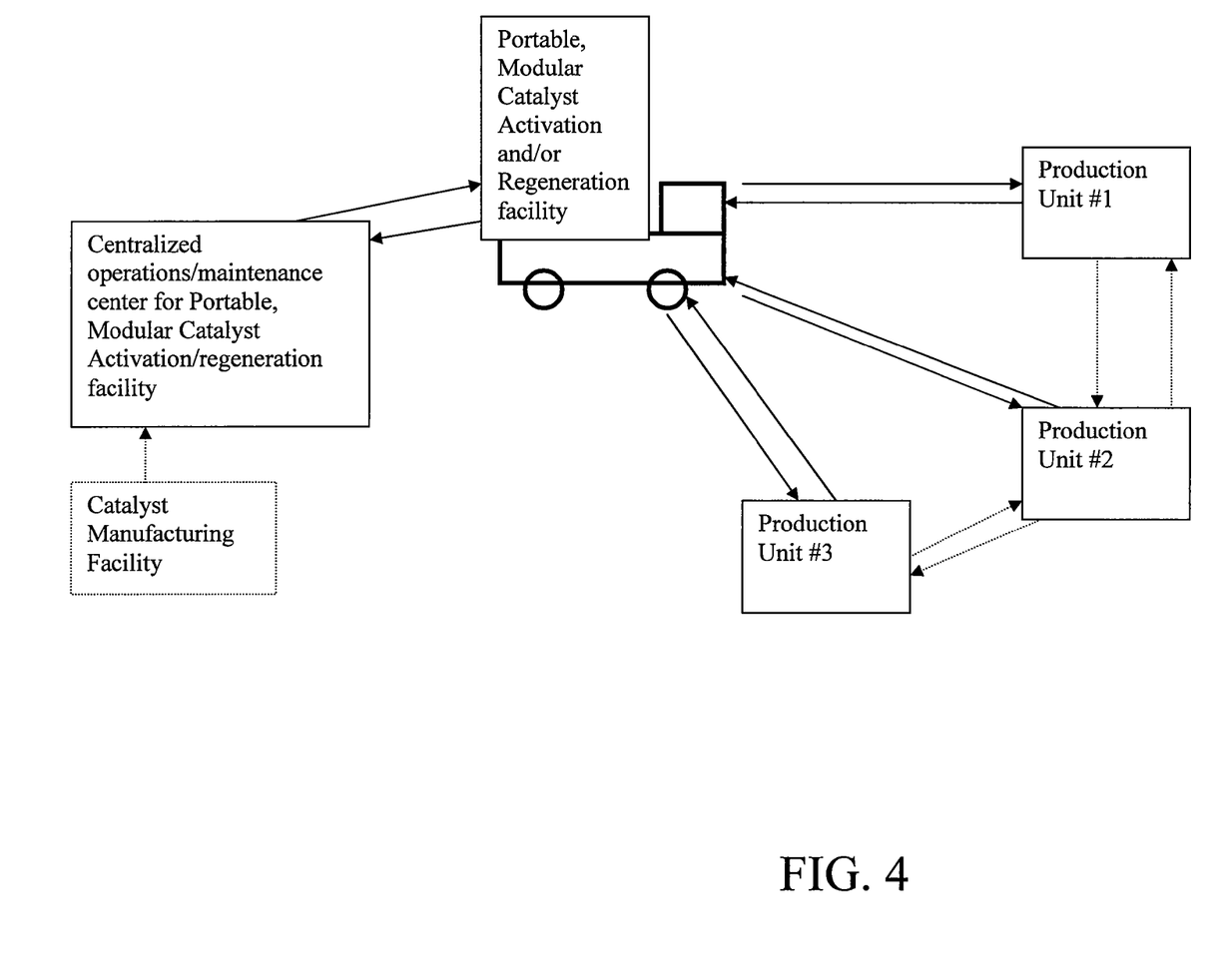
FIG. 4 is a schematic diagram illustrating a first embodiment of the invention.

Referring to FIG. 4, in a first embodiment of the invention, a modular, portable, self-contained FT and/or oxygenate synthesis catalyst activation and regeneration facility is constructed. Such modular, portable, self-contained FT and/or oxygenate synthesis catalyst activation and regeneration facility includes all equipment needed for activation and regeneration of FT and/or oxygenate synthesis catalysts as well as utilities needed for such activation and/or regeneration. Such equipment may include: (1) that required for H2 and/or N2 (or other required additional gases) generation and purification, (2) recycle compressors, (3) gas dryers, (4) electric and/or fired heaters, (5) hot oil (or other heat transfer fluid) heating/cooling systems with circulation pumps, (6) heat exchangers, and/or (7) a control system (including suitable interfaces for communication with the process unit). Such modular activation and regeneration facility is sized to fit in a standard (i.e. 8 ft×10 ft×40 ft) shipping container. These operator (manually) intensive processes would only be conducted in the presence of trained operators, who could travel with such facility. One such facility could service dozens of production units within a reasonable geographic area, yielding significant cost savings. This is a preferred embodiment for FT or oxygenate synthesis plants utilizing an FT or oxygenate synthesis catalyst requiring regeneration more than once annually. In a preferred embodiment, the portable activation/regeneration unit is connected directly to the product unit in order to permit the activation and/or regeneration procedure to be conducted within the combined activation/regeneration unit and the FT and/or oxygenate synthesis reactor. In such embodiments, the catalyst is not exposed to the environment. In some embodiments, catalyst may be produced at a central facility which may include catalyst manufacturing and maintenance and/or catalyst activation and/or catalyst regeneration capabilities. Alternatively, the catalyst may be delivered to the central facility from a separate catalyst manufacturing facility. In some embodiments, the portable, modular catalyst activation and/or regeneration facility moves to multiple production locations. Alternatively, the portable, modular catalyst activation and/or regeneration facility moves between production locations (as shown by the dotted lines). In some embodiments, the portable, modular catalyst activation and/or regeneration facility returns to centralized operations/maintenance center as needed.

Figure 5:
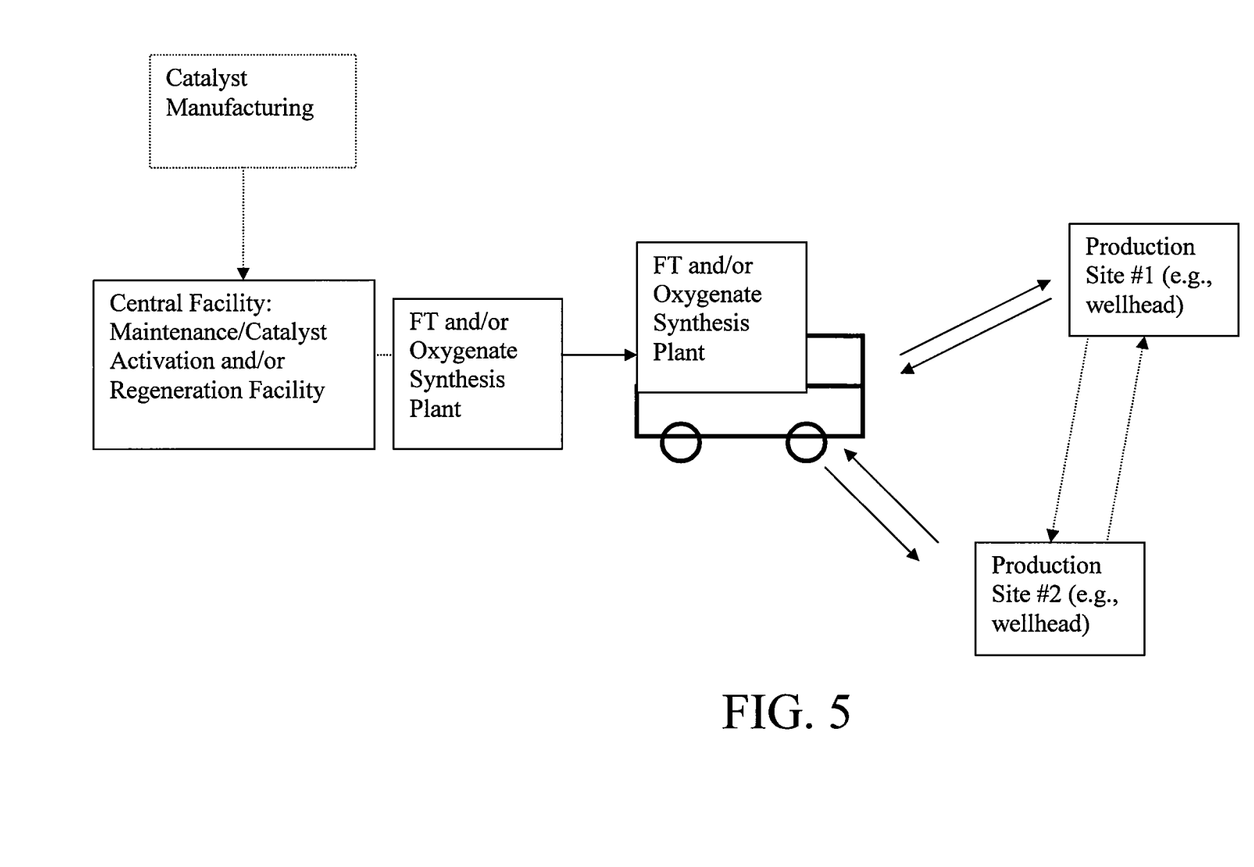
FIG. 5 is a schematic diagram illustrating a second embodiment of the invention.

Referring to FIG. 5, in a second embodiment of the invention, the initial catalyst activation is conducted at a centralized, stationary facility, such as a catalyst manufacturing facility, the FT and/or oxygenate synthesis plant, or a multi-unit servicing center. In such embodiment, the catalyst is activated in-situ in the reactor in the production unit, a requirement for most monolith, plate-tube, finned-tube and/or microchannel synthesis reactors. In-situ activation is also desirable for fixed bed synthesis reactors. Following activation the production unit, including the synthesis reactor, with the activated catalyst already loaded, is then transferred into the field production site(s). Such field production sites may include synthesis gas production facilities utilizing initial, natural gas, coal, biomass or other carbon-containing feeds. In the second embodiment, at the end of the catalyst's useful life, the production unit, including the synthesis reactor with the used catalyst loaded, is transferred to a centralized facility for catalyst replacement. The centralized facility of this invention is preferably located in a more industrialized location, where the required mechanical equipment and technically trained personnel are more readily available than at very remote plant sites. The second embodiment is preferred for catalysts that do not require periodic regeneration-type treatments (i.e., catalysts that require initial activation only), as well as for those catalysts that require such treatments very rarely (e.g., less than every 6 months, preferably less than every 12-18 months, and more preferably less than every 24 months). In some embodiments, the production unit is operated for a short time after activation prior to relocation to the production site (the location of the feedstock, e.g., gas field, coal field) to allow for catalyst performance (activity and selectivity) testing prior to transportation and installation. Such operation prior to transportation would further allow for protection of the catalyst from inadvertent re-oxidation, at least for FT synthesis where solid wax would coat the catalyst surface following reaction (and cooling). In some embodiments, catalyst may be delivered to a central facility which may include maintenance and/or catalyst manufacturing, activation and/or catalyst regeneration capabilities. Alternatively, the catalyst may be delivered to the central facility from a separate catalyst manufacturing facility. The synthesis plant may be operated for a brief period of time following activation and prior to transport to multiple production sites. The synthesis plant may also be transported between multiple production sites.

Figure 6:
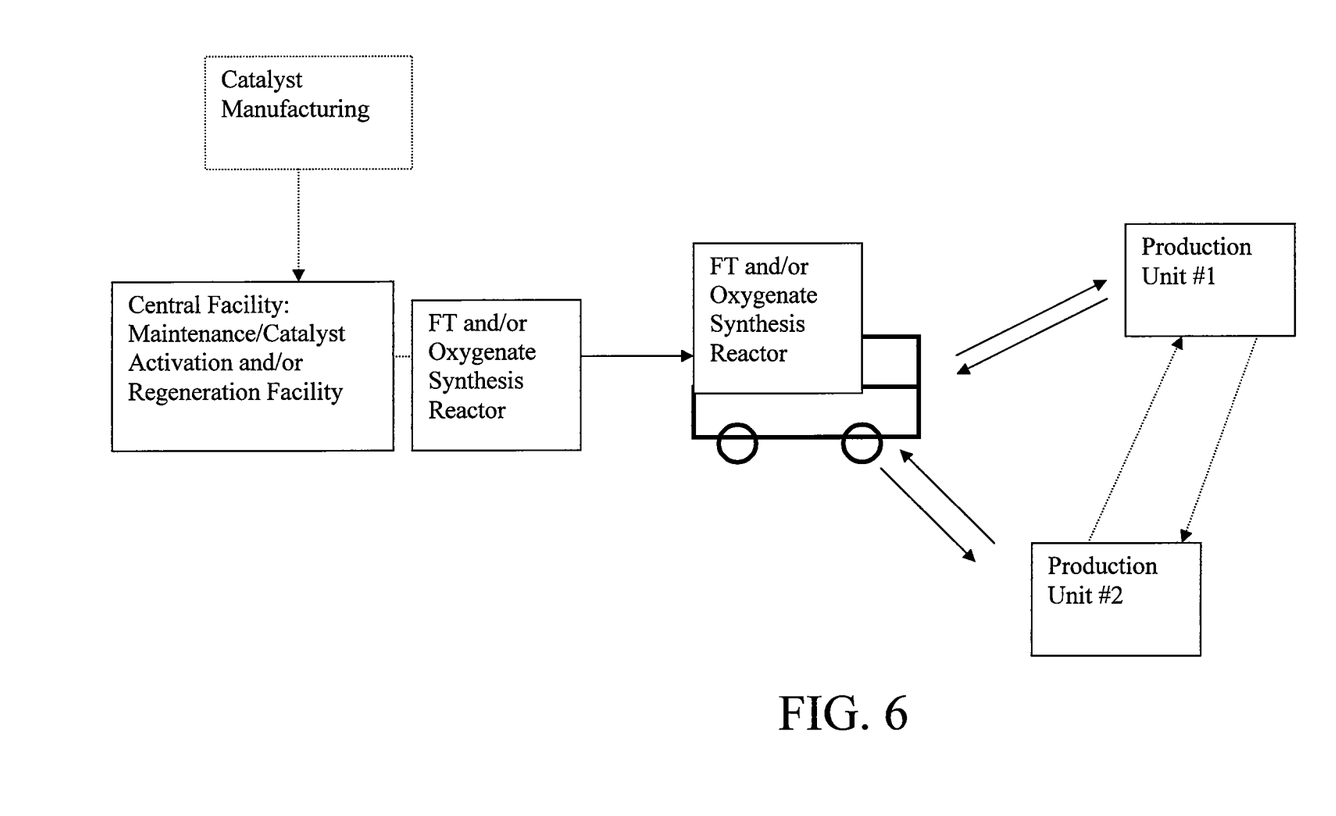
FIG. 6 is a schematic diagram illustrating a third embodiment of the invention.

Referring to FIG. 6, in a third embodiment of the invention, the FT and/or oxygenate synthesis reactor is first loaded with the FT and/or oxygenate synthesis catalyst and the catalyst activated at a centralized, stationary facility, as in the second embodiment discussed above. In the third embodiment of the invention, the FT and/or oxygenate synthesis reactor is necessarily relatively small and readily removable from the stationary production unit without excessive mechanical equipment requirements such as large cranes or other lifting/moving devices. Further, the third embodiment is most useful where the FT and/or oxygenate synthesis reactor is readily transportable when loaded with catalyst. In some embodiments, catalyst may be produced at a central facility which may include catalyst manufacturing and maintenance and/or catalyst activation and/or catalyst regeneration capabilities. Alternatively, the catalyst may be delivered to the central facility from a separate catalyst manufacturing facility. The FT and/or oxygenate synthesis reactor may be operated at or near the central facility for a brief period of time following catalyst activation and/or loading and prior to transport to multiple production sites. The FT and/or oxygenate synthesis reactor may also be transported between multiple production sites.

The small, compact size of many proposed microchannel, monolith and/or coated wall reactors allows the possibility of designing Fischer-Tropsch and oxygenate synthesis reactors in a manner such that the catalyst is contained within a removable section of the reactor (e.g. a catalyst compartment). One such microchannel reactor having a catalyst compartment which could be made removable is disclosed in U.S. Pat. No. 6,989,134, the disclosure of which is incorporated herein in its entirety. In yet another aspect of the invention, only the catalyst compartment, rather than the entire Fischer-Tropsch and/or oxygenate synthesis reactor is transported to stationary catalyst activation and/or stationary catalyst regeneration or replacement facilities.

It will be apparent to one of ordinary skill in the art that the foregoing embodiments of the invention may be practiced in connection with processes that produce: (1) only Fischer-Tropsch products; (2) only oxygenate products; or (3) a combination of Fischer-Tropsch and oxygenate products, and particularly Fischer-Tropsch products and methanol.

I claim:

1. A process for catalyst treatment comprising:
   (a) loading a Fischer-Tropsch synthesis catalyst into a Fischer-Tropsch synthesis reactor wherein the Fischer-Tropsch synthesis reactor is located at a catalyst treatment facility;
   (b) activating the Fischer-Tropsch synthesis catalyst in the Fischer-Tropsch synthesis reactor, while the reactor is located at the catalyst treatment facility;
   (c) transporting the Fischer-Tropsch synthesis reactor containing active Fischer-Tropsch synthesis catalyst from the catalyst treatment facility to a production location wherein a feedstock for a synthesis gas production reactor is available;
   (d) operating the Fischer-Tropsch synthesis reactor at the production location to convert the feedstock to synthesis gas;
   (e) transporting the Fischer-Tropsch synthesis reactor containing used Fischer-Tropsch synthesis catalyst from the production location to the catalyst treatment facility;
   (f) treating the Fischer-Tropsch synthesis catalyst wherein the step of treating the Fischer-Tropsch synthesis catalyst is selected from the group consisting of (i) replacing the used Fischer-Tropsch synthesis catalyst by removing the Fischer-Tropsch synthesis catalyst from the Fischer-Tropsch synthesis reactor and adding new Fischer-Tropsch synthesis catalyst to the Fischer-Tropsch synthesis reactor; and (ii) regenerating the Fischer-Tropsch synthesis catalyst in the Fischer-Tropsch synthesis reactor; and
   (g) repeating (b), (c) (d) (e) and (f) so as to continue the conversion of feedstock to synthesis gas at said production location and the replacement or regeneration of used catalyst.

2. The process of claim 1 wherein the Fischer-Tropsch synthesis reactor is a multi tubular fixed bed reactor.

3. The process of claim 1 wherein the Fischer-Tropsch synthesis reactor is a slurry bubble column reactor or fixed fluidized bed reactor.

4. The process of claim 1 wherein the Fischer-Tropsch catalyst is a cobalt-based, iron-based catalyst, or a mixture thereof.

5. The process of claim 1 wherein the synthesis gas production reactor is a steam methane reforming reactor, a carbon dioxide reforming reactor, or a combination thereof.

6. The process of claim 1 wherein the synthesis gas production reactor comprises at least one of an autothermal reformer, a thermal partial oxidation reactor-and a catalytic partial oxidation reactor.

7. The process of claim 1 where in the feedstock for the synthesis gas production reactor is natural gas, resid, coke, bitumen, coal, biomass or a combination thereof.

8. The process of claim 1 further comprising operating the Fischer-Tropsch synthesis reactor after step (b) and before step (c).

9. A process for catalyst treatment comprising:
   (a) loading an oxygenate synthesis catalyst into an oxygenate synthesis reactor located at a catalyst treatment facility;
   (b) activating the oxygenate synthesis catalyst in the oxygenate synthesis reactor while the reactor is located at the catalyst treatment facility;
   (c) transporting the oxygenate synthesis reactor containing active oxygenate synthesis catalyst from the catalyst treatment facility to an oxygenate production unit located at a production location wherein a feedstock for a synthesis gas production reactor is available;
   (d) operating the oxygenate synthesis reactor at the production location; to convert the feedstock to synthesis gas;
   (e) transporting the oxygenate synthesis reactor containing used oxygenate synthesis catalyst from the production location to the catalyst treatment facility; and
   (f) treating the oxygenate synthesis catalyst wherein the treating is selected from the group consisting of (i) replacing the used oxygenate synthesis catalyst by removing the oxygenate synthesis catalyst from the oxygenate synthesis reactor and adding new oxygenate synthesis catalyst to the oxygenate synthesis reactor; and (ii) regenerating the oxygenate synthesis catalyst in the oxygenate synthesis reactor; and
   (g) repeating (b), (c) (d) (e) and (f) so as to continue the conversion of feedstock to synthesis gas at said production location and the replacement or regeneration of used catalyst.

10. The process of claim 9 wherein the oxygenate synthesis reactor is a multi-tubular fixed bed reactor.

11. The process of claim 9 wherein the oxygenate synthesis reactor is a three-phase slurry reactor or a fluidized bed reactor.

12. The process of claim 9 wherein the oxygenate synthesis catalyst comprises a copper-based catalyst, a cobalt-based catalyst or a mixture thereof.

13. The process of claim 9 wherein the synthesis gas production reactor is a steam methane reforming reactor, a carbon dioxide reforming reactor, or a combination thereof.

14. The process of claim 9 wherein the synthesis gas production reactor comprises at least one of an autothermal reformer, a thermal partial oxidation reactor and a catalytic partial oxidation reactor.

15. The process of claim 9 where in the feedstock for the synthesis gas production reactor is natural gas, resid, coke, bitumen, coal, biomass or a combination thereof.

16. The process of claim 9 further comprising operating the oxygenate production unit after step (b) and before step (c).

17. A process for catalyst treatment comprising:
   (a) loading a synthesis catalyst into a production unit comprising a synthesis gas production reactor and a synthesis reactor wherein the production unit is located at a catalyst treatment facility;
   (b) activating the synthesis catalyst in the synthesis reactor while the production unit is located at a catalyst treatment facility;
   (c) transporting the production unit containing activated synthesis catalyst from the catalyst treatment facility to a production location wherein a feedstock for the synthesis gas production reactor is available;

(d) operating the production unit at the production location wherein the synthesis reactor produces one or more Fischer-Tropsch products and one or more oxygenates from the feedstock;

(e) transporting the production unit containing used synthesis catalyst from the production location to the catalyst treatment facility; and (f) treating the synthesis catalyst wherein the treating is selected from the group consisting of (i) replacing the used synthesis catalyst by removing the synthesis catalyst from the synthesis reactor and adding new synthesis catalyst to the Fischer-Tropsch synthesis reactor; and (ii) regenerating the synthesis catalyst in the synthesis reactor; and (g) repeating (b), (c) (d) (e) and (f) so as to continue the production of one or more Fischer-Tropsch products and one or more oxygenates from the feedstock at said production location and the replacement or regeneration of used catalyst.

18. The process of claim 17 wherein the synthesis reactor is a multi-tubular fixed bed reactor.

19. The process of claim 17 wherein the synthesis reactor is a slurry bubble column reactor or fixed fluidized bed reactor.

20. The process of claim 17 wherein the catalyst is a cobalt-based, copper-based, iron-based catalyst, or a mixture of any thereof.

21. The process of claim 17 wherein the synthesis gas production reactor is a steam methane reforming reactor, a carbon dioxide reforming reactor, or a combination thereof.

22. The process of claim 17 wherein the synthesis gas production reactor comprises at least one of an autothermal reformer, a thermal partial oxidation reactor and a catalytic partial oxidation reactor.

23. The process of claim 17 where in the feedstock for the synthesis gas production reactor is natural gas, resid, coke, bitumen, coal, biomass or a combination thereof.

24. The process of claim 17 further comprising operating the production unit after step (b) and before step (c).

25. The process of claim 1 wherein the feedstock is natural gas in an amount not more than 1000 Mscfd.

26. The process of claim 9 wherein the feedstock is natural gas in an amount not more than 1000 Mscfd.

27. The process of claim 17 wherein the feedstock is natural gas in an amount not more than 1000 Mscfd.

28. The process of claim 25 wherein the Fischer-Tropsch synthesis reactor is a monolith reactor or a microchannel reactor.

29. The process of claim 26 wherein the oxygenate synthesis reactor is a monolith reactor or a microchannel reactor.

30. The process of claim 27 wherein the synthesis reactor is a monolith reactor or a microchannel reactor.

* * * * *